US011669262B2

(12) United States Patent
Liu

(10) Patent No.: US 11,669,262 B2
(45) Date of Patent: Jun. 6, 2023

(54) METHOD, DEVICE, AND PRODUCT FOR MANAGING SCRUBBING OPERATION IN STORAGE SYSTEM

(71) Applicant: EMC IP Holding Company LLC, Hopkinton, MA (US)

(72) Inventor: Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 360 days.

(21) Appl. No.: 16/836,715

(22) Filed: Mar. 31, 2020

(65) Prior Publication Data
US 2021/0081130 A1 Mar. 18, 2021

(30) Foreign Application Priority Data

Sep. 16, 2019 (CN) .......................... 201910871009.2

(51) Int. Cl.
G06F 3/06 (2006.01)
G06F 11/16 (2006.01)

(52) U.S. Cl.
CPC .......... *G06F 3/0652* (2013.01); *G06F 3/0616* (2013.01); *G06F 3/0632* (2013.01); *G06F 3/0653* (2013.01); *G06F 3/0673* (2013.01); *G06F 11/1662* (2013.01); *G06F 2201/82* (2013.01)

(58) Field of Classification Search
CPC .... G06F 3/0652; G06F 3/0616; G06F 3/0632; G06F 3/0653; G06F 3/0673; G06F 11/1662; G06F 2201/82
See application file for complete search history.

(56) References Cited

U.S. PATENT DOCUMENTS

| 7,580,956 | B1* | 8/2009 | Xin | G06F 16/10 |
| 8,953,265 | B1* | 2/2015 | Ma | G06F 3/0689 |
| | | | | 369/53.42 |
| 10,599,504 | B1* | 3/2020 | BeSerra | G06F 11/3055 |
| 2005/0073884 | A1* | 4/2005 | Gonzalez | G06F 11/106 |
| | | | | 365/185.02 |
| 2011/0099419 | A1* | 4/2011 | Lucas | G06F 11/073 |
| | | | | 714/6.32 |
| 2014/0245062 | A1* | 8/2014 | Cooper | G06F 11/1092 |
| | | | | 714/6.22 |
| 2017/0242744 | A1* | 8/2017 | Wang | G06F 11/106 |
| 2018/0196622 | A1* | 7/2018 | Oshimi | G06F 12/0246 |
| 2020/0042380 | A1* | 2/2020 | Roberts | G06F 3/0614 |
| 2020/0251143 | A1* | 8/2020 | Nangare | G11B 5/012 |
| 2021/0011651 | A1* | 1/2021 | Lim | G06F 3/0653 |

* cited by examiner

*Primary Examiner* — Nanci N Wong
(74) *Attorney, Agent, or Firm* — Chamberlain, Hrdlicka, White, Williams & Aughtry

(57) ABSTRACT

The present disclosure relates to a method, device and product for managing scrubbing operations in a storage system. In the method for managing scrubbing operations in a storage system, regarding a plurality of extents included in the storage system, respective usage states of the plurality of extents are obtained. A group of target extents in which a failure will occur are detected from the plurality of extents based on the respective usage states of the plurality of extents. A scrubbing interval of the scrubbing operations to be performed on the storage system is adjusted according to the detected group of target extents. A scrubbing operation is performed on at least one part of the plurality of extents in the storage system according to the adjusted scrubbing interval, so as to identify a failed extent.

20 Claims, 10 Drawing Sheets

METHOD, DEVICE, AND PRODUCT FOR MANAGING SCRUBBING OPERATION IN STORAGE SYSTEM

CROSS-REFERENCE TO RELATED APPLICATIONS

This application claims priority to Chinese Application No. 201910871009.2 filed on Sep. 16, 2019. Chinese Application No. 201910871009.2 is hereby incorporated by reference in its entirety.

FIELD

Various implementations of the present disclosure relate to storage management, and more specifically, to a method, device and computer program product for managing scrubbing operations in a storage system.

BACKGROUND

With the development of data storage technology, various data storage devices now provide users with increasingly large data storage capacities, where the data storage devices also enable faster access to data stored thereon The concept of a storage device pool has been proposed. The storage device pool may comprise a plurality of storage devices, each of which may comprise a plurality of extents. At this point, extents may be allocated to user storage systems, so that user storage systems may use storage space of various storage devices in the storage device pool.

It will be understood that because various storage devices in the storage device pool differ in terms of usage duration and usage state, the possibility that storage devices fail is also different. Further, usage states of parts of a storage device may also differ somewhat, and some parts of the storage device may fail and be unusable. Therefore, it is difficult to predict latent failures in a storage device and further avoid data loss in a storage system.

SUMMARY

Therefore, it is desirable to develop and implement a technical solution for managing a storage system more effectively. It is desired that the technical solution be compatible with an existing storage system to manage the storage system more effectively by reconstructing configurations of the existing application system.

According to a first aspect of the present disclosure, there is provided a method for managing scrubbing operations in a storage system. In the method, regarding a plurality of extents included in the storage system, respective usage states of the plurality of extents are obtained. A group of target extents in which a failure will occur is detected from the plurality of extents based on the respective usage states of the plurality of extents. A scrubbing interval of the scrubbing operations to be performed on the storage system is adjusted according to the detected group of target extents. A scrubbing operation is performed on at least one part of the plurality of extents in the storage system according to the adjusted scrubbing interval, so as to identify a failed extent.

According to a second aspect of the present disclosure, there is provided a device, comprising: at least one processor; a volatile memory; and a memory coupled to the at least one processor, the memory having instructions stored thereon, the instructions, when executed by the at least one processor, causing the device to perform acts for managing scrubbing operations in a storage system. The acts comprise: regarding a plurality of extents included in the storage system, obtaining respective usage states of the plurality of extents; detecting a group of target extents in which a failure will occur from the plurality of extents based on the respective usage states of the plurality of extents; adjusting a scrubbing interval of the scrubbing operations to be performed on the storage system according to the detected group of target extents; and performing a scrubbing operation on at least one part of the plurality of extents in the storage system according to the adjusted scrubbing interval, so as to identify a failed extent.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
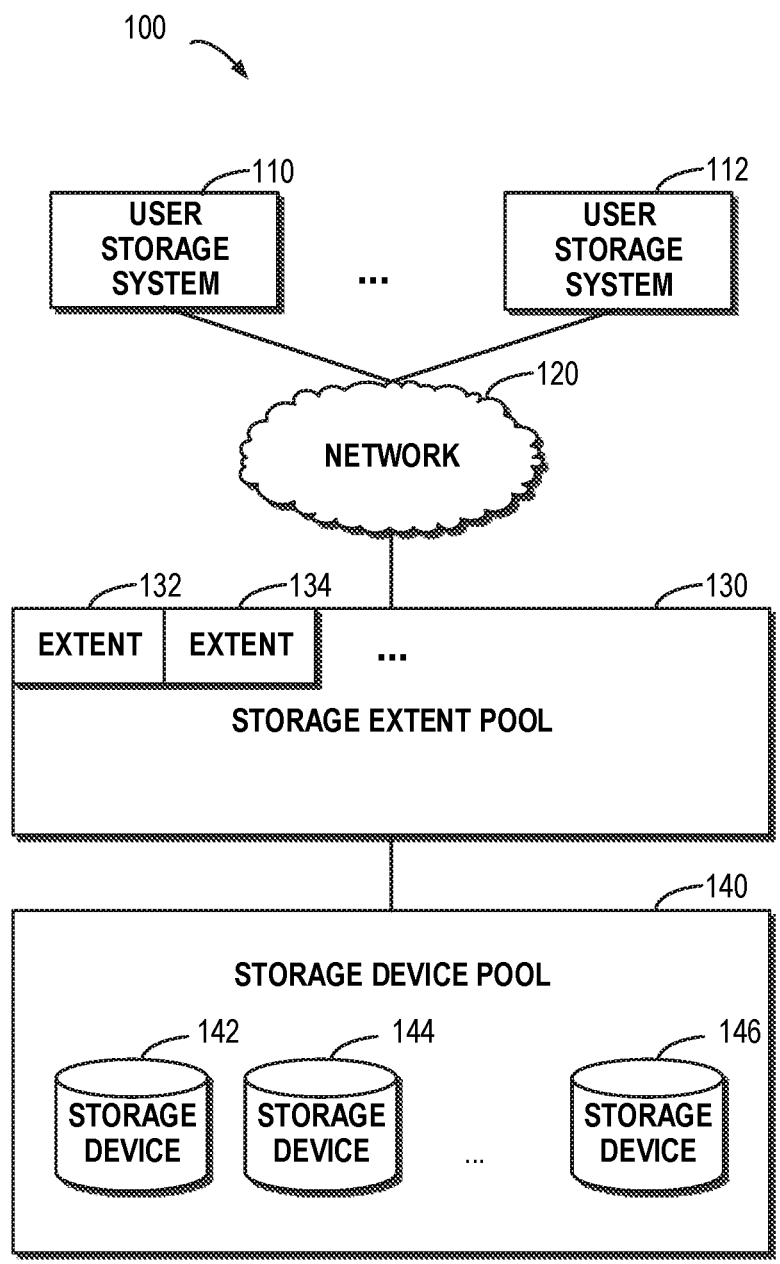
FIG. 1 schematically shows a block diagram of a storage system in which a method of the present disclosure may be implemented.

For the sake of description, an introduction is first given to an application environment of the present disclosure. FIG. 1 schematically shows a block diagram of a storage system 100 in which a method of the present disclosure may be implemented. As depicted, the storage system 100 may provide storage space to one or more user storage systems. For example, a user storage system 110, . . . , and a user storage system 112 may exist. It will be understood that the storage system 100 may be a centralized storage system or a distributed storage system. Description is presented below by taking a distributed storage system as an example.

As shown in FIG. 1, the user storage system 110 may access extents 132, 134, etc. in a storage extent pool 130 via a network 120. Here the storage extent pool 130 may comprise a plurality of extents, and these extents may be allocated to one or more storage systems. For example, the extents 132, 134, etc. may be allocated to the user storage system 110, while other extents may be allocated to the user storage system 112. A storage device pool 140 may be configured, which may comprise a plurality of storage devices, such as storage devices 142, 144, . . . , 146. The plurality of extents in the storage extent pool 130 may come from the same or different storage devices. At this point, the plurality of storage devices jointly provide storage space for the storage system 100.

It will be understood that the storage devices 142, 144, . . . , 146 are not indefinitely usable but have certain lifecycles. When the wear level of a storage device amounts to a certain degree, the storage device might reach the end of its life. A technical solution has been proposed for monitoring the wear level of each storage device in the storage device pool 140 and further managing the storage device pool 140 and updating the devices.

For example, scrubbing operations have been performed on storage devices, so as to detect and correct Latent Sector Errors (LSE) on storage devices in advance. For most storage systems, one or more storage devices in the storage systems may be scrubbed in a periodic way. For example, all storage devices may be scrubbed once a month. However, scrubbing operations will cause extra overheads. Insufficient scrubbing cannot detect failures in the storage system in time, while excessive scrubbing will badly degrade the performance of the storage system due to scanning access. Therefore, how to perform scrubbing operations in a more effective way has become an urgent issue.

To solve the above drawbacks, implementations of the present disclosure provide a method, device and computer program product for managing scrubbing operations in a storage system 100. With implementations of the present disclosure, a fixed scrubbing interval is no longer used, and the scrubbing interval is adjusted dynamically according to usage states of various extents in the storage system 100, and then a scrubbing operation is performed so as to detect a failed extent in the storage system 100. Here, the scrubbing interval refers to a time interval between two successive scrubbing operations. A brief description is presented to example implementations of the present disclosure with reference to FIG. 2 below.

Figure 2:
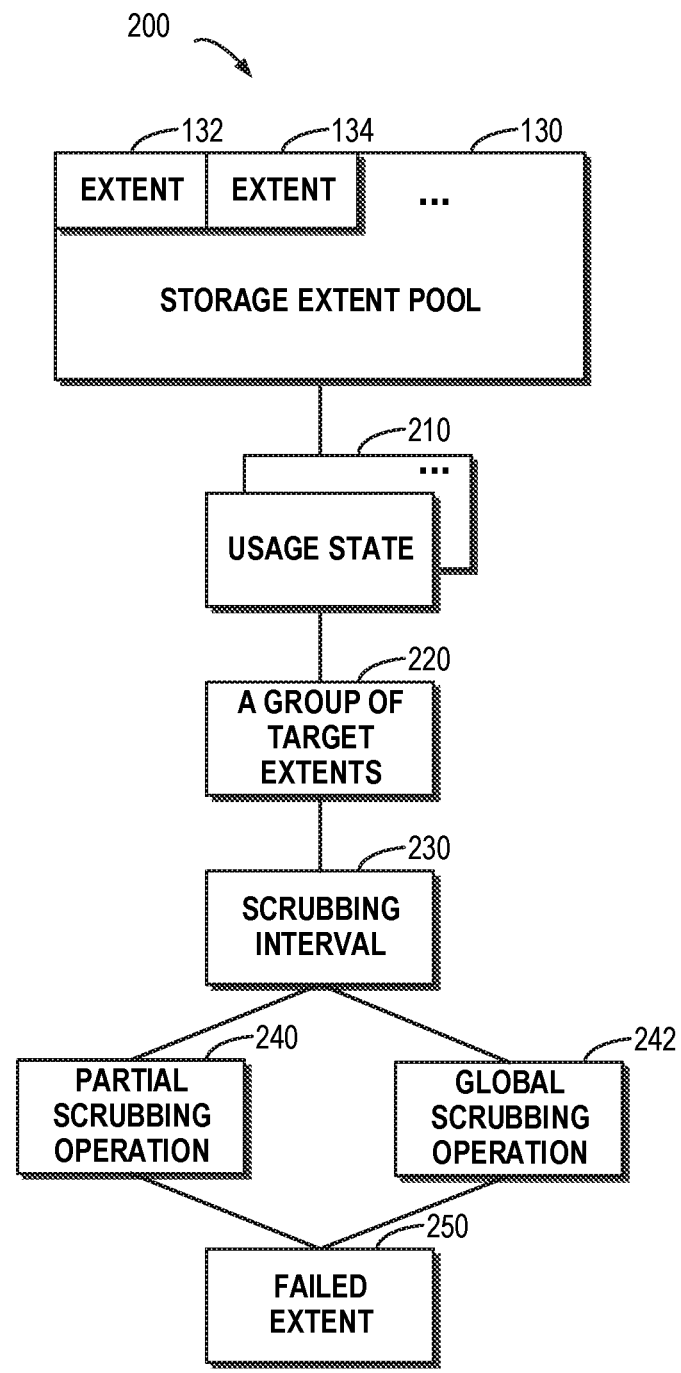
FIG. 2 schematically shows a block diagram for managing scrubbing operations in a storage system according to one implementation of the present disclosure.

FIG. 2 schematically shows a block diagram 200 for managing scrubbing operations in the storage system 100 according to one implementation of the present disclosure. As depicted, regarding a plurality of extents 132 and 134 in the storage extent pool 130, respective usage states 210 of the plurality of extents may be obtained. Subsequently, a group of target extents 220 where latent failures will occur may be detected from the plurality of extents based on the respective usage states 210 of the plurality of extents.

A scrubbing interval of performing scrubbing operations to the storage system 100 may be adjusted according to the detected group of target extents 220. Specifically, if a group of target extents where latent failures will occur are detected, this means failures may occur in storage devices in the storage system 100 to which the group of target extents belong. At this point, a smaller value may be set to a scrubbing interval 230, and a partial scrubbing operation 240 may be performed on one or more storage devices to which the group of target extents 220 belong. If no target extent where latent failures will occur is detected, this means the storage system 100 is in normal state as a whole. At this point, an appropriate scrubbing interval 230 may be selected and a global scrubbing operation 242 may be performed on the storage system 100. According to example implementations of the present disclosure, both the partial scrubbing operation 240 and the global scrubbing operation 242 can detect a failed extent 250.

With example implementations of the present disclosure, the partial scrubbing operation 240 can handle a problematic address range (i.e., address range to which the detected group of target extents 220 belong) in time. On the other hand, the scrubbing interval 230 of performing scrubbing operations may be determined according to a current usage state of the storage system 100. In this way, insufficient scrubbing and excessive scrubbing can be avoided as far as possible, and scrubbing operations may be performed in a more flexible way. More details of example implementations of the present disclosure will be described with reference to FIG. 3 below.

Figure 3:
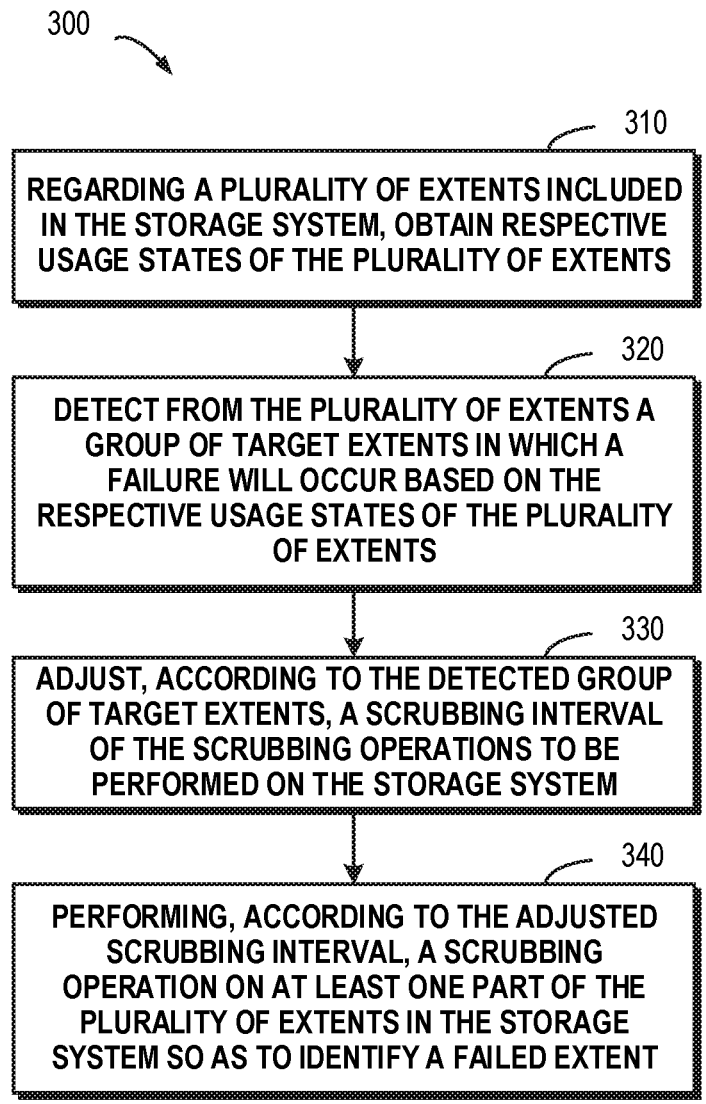
FIG. 3 schematically shows a flowchart of a method for managing scrubbing operations in a storage system according to one implementation of the present disclosure.

FIG. 3 schematically shows a flowchart of a method 300 for managing scrubbing operations in the storage system 100 according to one implementation of the present disclosure. As depicted, at block 310, regarding a plurality of extents included in the storage system 100, respective usage states of the plurality of extents may be obtained. It will be understood that extents in the storage system 100 may come from the plurality of storage devices 142, 144, . . . , 146 etc. in the storage device pool 140. While running, the various storage devices 142, 144, . . . , 146 may involve varieties of states, such as driver temperature, power-on hours, allocated sectors counter, etc.

Further, each of the storage devices 142, 144, . . . , 146 may comprise a plurality of extents. It will be understood that each extent may have a corresponding usage state. Here the usage state may comprise the above mentioned states of the storage device to which it belongs. In addition, the usage state may further comprise a state of the extent itself, such as an address of the extent, whether the extent has a failure, etc. It will be understood that the illustrations above are merely aspects the usage state may comprise, and according to example implementations of the present disclosure, the usage state may comprise more or less aspects.

At block 320, a group of target extents 220 where latent failures will occur may be detected from the plurality of extents based on the respective usage states 210 of the plurality of extents. More details on how to determine the group of target extents 220 will be described with reference to FIG. 4. This figure schematically shows a block diagram 400 for detecting the group of target extents 220 where latent failures will occur in the storage system 100 according to one implementation of the present disclosure. As depicted, respective features 410 of various extents among the plurality of extents may be determined based on the respective usage states 210 of the plurality of extents. It will be understood that the feature 410 refers to an indication for describing a current usage state of the extent. According to example implementations of the present disclosure, the feature may comprise a plurality of dimensions, and each dimension may represent data of one aspect of the usage state. In a simple example, the feature 410 of the extent may be represented using a three-dimensional vector (address, temperature, whether a failure occurs). According to example implementations of the present disclosure, the feature may further be represented using a more complex data structure.

Figure 4:
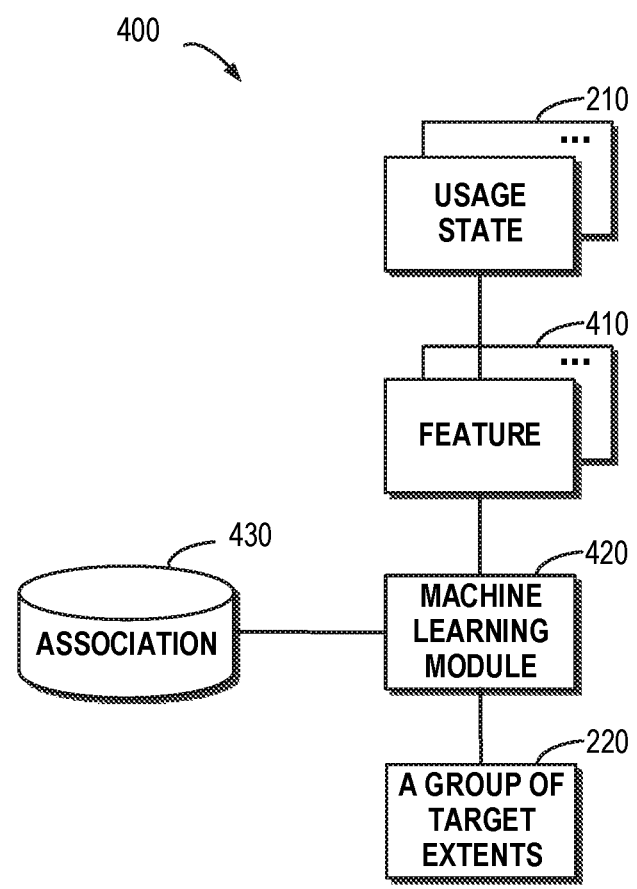
FIG. 4 schematically shows a block diagram for detecting in a storage system a group of target extents in which latent failures will occur according to one implementation of the present disclosure.

As shown in FIG. 4, an association 430 between failures in extents in storage devices in the storage device pool 140 and features of the extents may be obtained. It will be understood that the association 430 here may be determined based on extents in storage devices of a specific model and historical experience indicating whether failures have occurred in the extents. In this implementation, a machine learning module 420 may be used to call the association 430. Further, the machine learning module 420 may identify a target extent where a failure will occur from the plurality of extents based on the respective features 410 of the plurality of extents and the association 430.

With the implementation shown in FIG. 4, it is possible to predict, based on the association 430, in which extent(s) in the plurality of storage devices 142, 144, . . . , 146 in the storage device pool 140 a failure/failures may occur. According to example implementations of the present disclosure, failure identifiers of various extents may be obtained by scanning these extents. Suppose a three-dimensional vector (address, failure identifier, whether a failure occurs) is used to represent the feature 420 of the extent, and the association 430 defining the extent is subject to the risk of failing when a value of the failure identifier is a specific value. At this point, the feature of each extent may be inputted to the machine learning module 420 separately, and the machine learning module 420 may identify a target extent in which a failure may occur based on the association 430.

According to example implementations of the present disclosure, the association may be trained based on sample features of a plurality of sample extents in a group of sample storage devices and failures in the plurality of sample extents. Machine learning technology is already a mature technical solution for handling various complex problems. Based on machine learning technology, the association 430 may be trained using sample features (including features that cause failed extents and features that do not cause failed extents) obtained from historical operations. With the above example implementations, a more reliable basis may be provided for subsequent operations of identifying failed extents.

It will be understood that the specific type of the association 430 is not intended to be limited throughout the context of the present disclosure, but the association 430 may be defined using various machine learning techniques that are already known or to be developed in the future. According to one example implementation of the present disclosure, the association 430 may be obtained based on a neural network model. With the example implementation, the obtained association 430 may describe with which feature an extent is more susceptible to failure, so the association 430 may predict in which extents in other storage devices failures may occur. In this way, an extent in a storage device in which a failure may occur may be determined based on historical experience in a more accurate way.

According to example implementations of the present disclosure, the usage state 210 may comprise a response time of each extent among the plurality of extents for an access request. It will be understood that since a failure may occur in some area of a storage device and an access request for the area is delayed, the response time may be an important indicator regarding whether a failure occurs in the storage device. Based on the response time of each extent, it may be judged more accurately whether a failure occurs in the extent.

According to example implementations of the present disclosure, the usage state further comprises failure information and a failure identifier of each extent among the plurality of extents. Usually the failure identifier of each extent of a storage device may be obtained by scanning the extent. Here the failure identifier may briefly indicate whether the area has a failure, whether the failure is recoverable, etc. Further, for a different equipment vendor, a dedicated field may be defined to represent failure information which is associated with a given model of storage device and which is used to describe more details about a failure. With the above example implementations, various aspects of a failure may be described with finer granularity, and further the type of the failure may be determined in a more accurate way.

According to example implementations of the present disclosure, BMS may be performed on the storage device so as to obtain the usage state. BMS is an approach for scanning a storage device so as to obtain usage states of various address fields in the storage device. By scanning the storage device, a scanning result that indicates the usage state of the storage device may be obtained as shown in FIG. 5.

Figure 5:
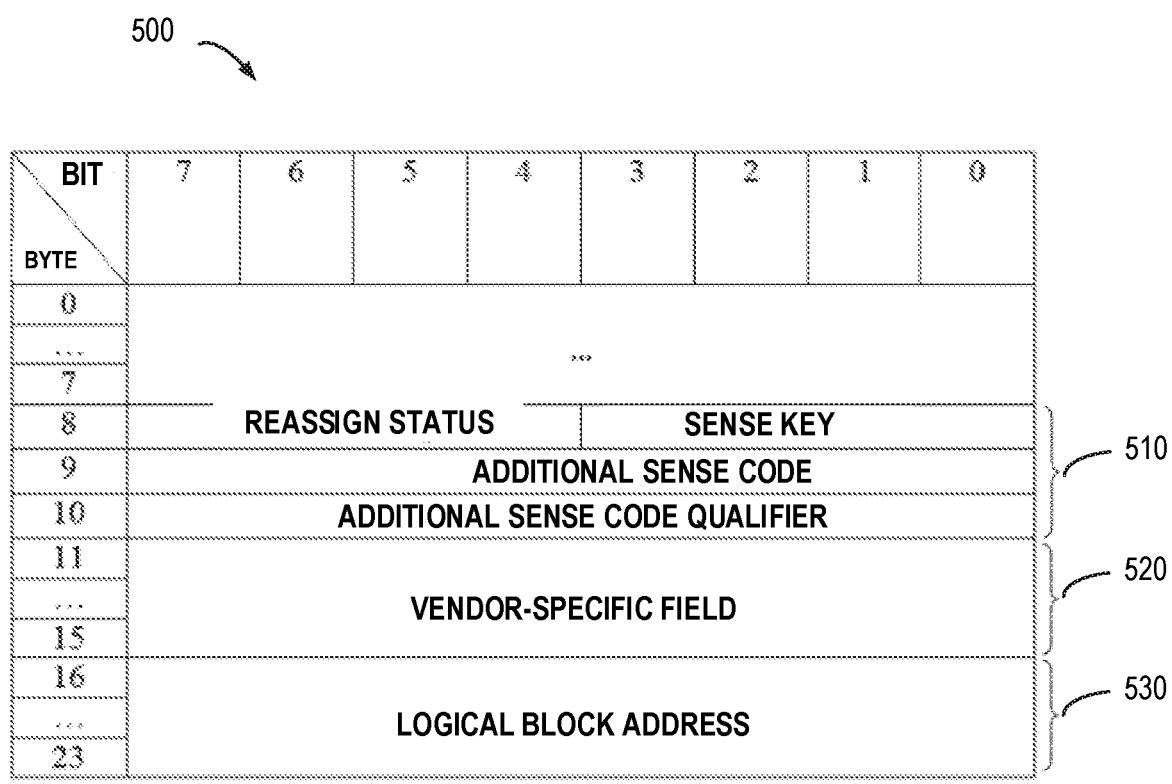
FIG. 5 schematically shows a block diagram of a scanning result of performing Background Media Scan (BMS) to a storage device according to one implementation of the present disclosure.

FIG. 5 schematically shows a block diagram of a scanning result 500 of performing BMS to a storage device according to one implementation of the present disclosure. In the scanning result 500 shown in FIG. 5, a column denotes a number of each byte in the data structure, and a row denotes a number of each bit in one byte. As depicted, the $16^{th}$ to $23^{rd}$ bytes (as shown by a reference numeral 530) of the scanning result 500 show a logical block address in the storage device, the address identifying a location of an extent. The $8^{th}$ to $10^{th}$ bytes (as shown by a reference numeral 510) of the scanning result 500 show a failure identifier 510 of the extent at the logical block address 530. Specifically, the failure identifier 510 may further comprise: reassign status, sense key, additional sense code, additional sense code qualifier and other refined information. The $11^{th}$ to $15^{th}$ bytes (as shown by a reference numeral 520) of the scanning result 500 show a vendor-specific field, which is defined by the vendor of the storage device so as to describe more information about the failure. Those skilled in the art may obtain specific definition of the above dimensions by consulting the definition of a BMS scanning result, which is not detailed in the context of the present disclosure.

According to example implementations of the present disclosure, for a given extent among the plurality of extents, if the response time of the given extent is higher than a threshold, a given feature of the given extent among the plurality of extents are determined. As the response time is a key indicator indicating whether the extent has a latent failure, the subsequent operation of determining features may be triggered only when the response time is relatively high. In this way, a failed extent may be detected in a more effective way.

According to example implementations of the present disclosure, the feature of each extent among the plurality of extents may be determined one by one. Specifically, regarding a given extent, a given feature of the given extent may be determined based on the given extent's failure identifier and failure information. With the above example implementations, the failed extent may be determined in a more effective and accurate way. More details about features will be described with reference to FIG. 6 below.

Figure 6:
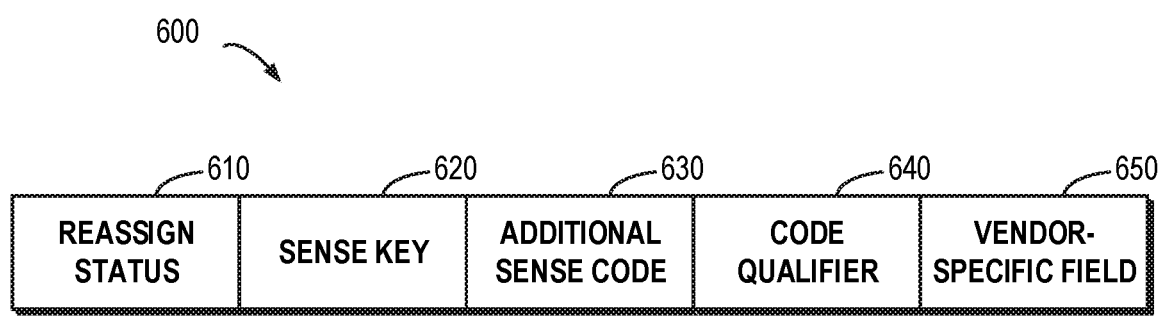
FIG. 6 schematically shows a block diagram of a feature of an extent according to one implementation of the present disclosure.

FIG. 6 schematically shows a block diagram of a data structure 600 of a feature of an extent according to one implementation of the present disclosure. As depicted, the feature may be presented as a vector, and each dimension of the vector may describe one aspect of the usage state. According to example implementations of the present disclosure, the feature may comprise five dimensions: reassign status 610, sense key 620, additional sense code 630, code qualifier 640, and vendor specific field 650. It will be understood FIG. 6 merely illustrates one example data structure 600 for representing the feature. According to example implementations of the present disclosure, other data structures may also be used. In one example, the vector for describing the feature may comprise more or less dimensions. For example, the vector may further comprise information about a storage device where the extent resides.

Figure 7:
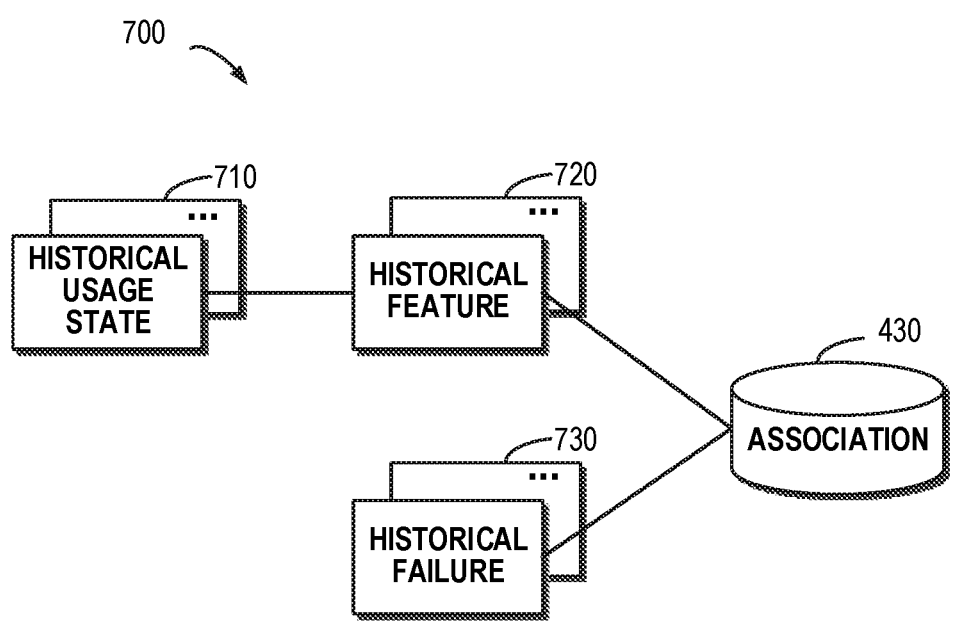
FIG. 7 schematically shows a block diagram for obtaining an association between features and failures of extents based on historical data training according to one implementation of the present disclosure.

According to example implementations of the present disclosure, the association 430 may be trained based on features of a plurality of extents of a plurality of storage devices and failures in the plurality of extents of the plurality of storage devices. FIG. 7 schematically shows a block diagram 700 for obtaining an association between features and failures of extents based on historical data training according to one implementation of the present disclosure. As depicted, historical usage states 710 of a plurality of extents in the storage system 100 may be obtained, and historical features 720 of the plurality of extents may be determined based on the historical usage states 710. Historical failures 730 may be determined based on historical information, here the historical features 730 indicate whether failures occur in the plurality of extents in a time period when the historical states are collected. Therefore, the association 430 may be trained using the historical features 720 and the historical failures 730 as training data. Here, the trained association 430 may represent an association between a feature and a failure.

Returning to block 330 in FIG. 3, the scrubbing interval 230 of performing scrubbing operations to the storage system 100 may be adjusted according to the detected group of target extents 220. According to example implementations of the present disclosure, if it is determined that the group of target extents 220 satisfy a predetermined condition, the scrubbing interval 230 is set as "execute immediately." For example, the predetermined condition may comprise a threshold number of extents where failures will occur. If it is found the number of extents in the group of target extents 220 amounts to the threshold number, then it is considered that the storage system 100 runs a high risk, so a scrubbing operation needs to be executed immediately. According to example implementations of the present disclosure, the predetermined condition may further comprise a capacity of extents where failure will occur. If it is found the storage space of the group of target extents 220 reaches the threshold capacity, then a scrub needs to be executed immediately.

At block 340, a scrubbing operation may be performed on at least one part of a plurality of extents in the storage system 100 according to the adjusted scrubbing interval, so as to identify the failed extent 250. Here, regarding the group of target extents 220, the partial scrubbing operation 240 may be executed immediately so as to identify the failed extent.

A specific example of performing a partial scrubbing operation on the storage system 100 has been described in detail with reference to FIGS. 2 to 7. More details about the global scrubbing operation 242 will be described below. Returning to FIG. 3, if no target extent where a latent failure will occur is detected at block 320, this means that the extents in the storage devices in the storage system 100 are all in normal state. At this point, the partial scrubbing operation 240 does not need to be performed on the storage system 100, but a global scrub may be performed on the storage system 100 at conventional intervals of scrubbing operations. It will be understood since the wear level of a storage device will affect the error condition in the storage device, the scrubbing interval of performing the global scrubbing operations 242 may be adjusted based on the wear level.

Figure 8:
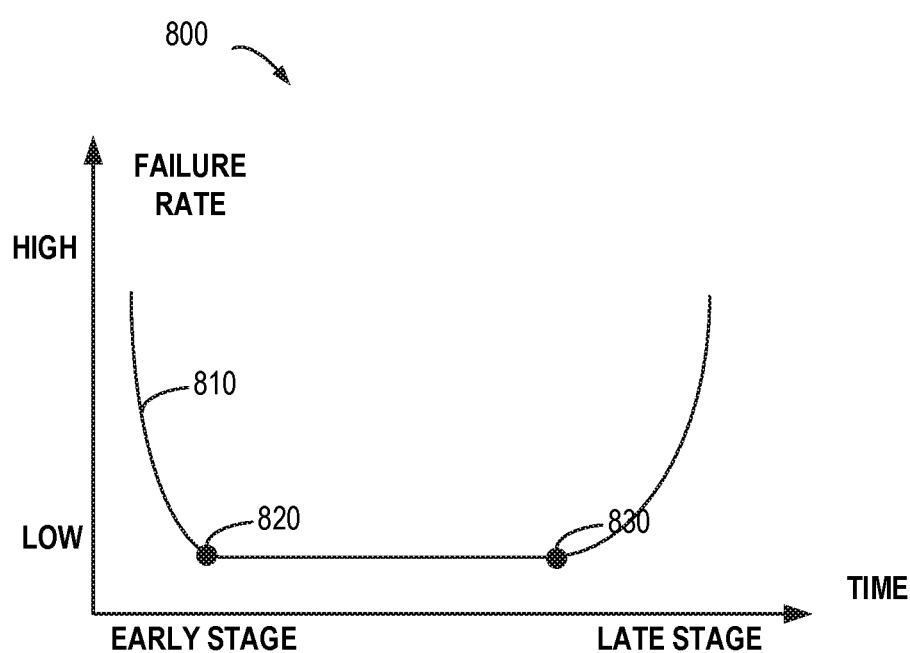
FIG. 8 schematically shows a block diagram of failure rates in a storage device according to one implementation of the present disclosure.

FIG. 8 schematically shows a block diagram 800 of failure rates in the storage device 100 according to one implementation of the present disclosure. As depicted, the horizontal axis schematically shows the timeline of the whole lifecycle of the storage device, where the left represents the early stage of the lifecycle, and the right represent the late stage of the lifecycle. The vertical axis schematically shows the probability that a failure occurs in the storage device. As shown by a curve 810, a higher failure rate occurs at the early days when the storage device is put into use. As the storage device continues to be used, a lower failure rate occurs in the middle of the lifecycle. Further, when the storage device enters the late stage of the lifecycle, the failure rate rises again due to wear and other reasons.

A technical solution has been proposed for predicting change points in a failure rate by monitoring the usage state of a storage device. For example, two change points 820 and 830 in the curve 810 may be determined based on a comparison between error rates of data reads/writes within the latest time period and a previous time period. Then, the lifecycle of the storage device may be divided into early, middle and late stages based on the two change points 820 and 830. According to example implementations of the present disclosure, a wear level of a plurality of extents may be determined, and then the stage the storage device currently locates in may be determined based on the wear level.

According to example implementations of the present disclosure, the wear level of the storage device may be determined based on an IO workload of the storage device. It will be understood here the IO workload refers to how many read/write operations have been performed on the storage device. The lifecycle of the storage device is closely correlated with the read/write data total on the storage device. Regarding a specific type of storage device, there exist corresponding threshold totals for read/write operations. Therefore, respective read/write data thresholds corresponding to the change points 820 and 830 described with reference to FIG. 8 may be determined based on statistics on the read/write data total. During the running of the storage system 100, the read/write data total on each storage device may be monitored, and the monitored read/write data total may be compared with the read/write data threshold so as to determine whether each storage device currently locates in the early stage, the middle stage or the late stage.

According to example implementations of the present disclosure, the wear level of the storage device may further be determined based on power-on time of the storage device. Specifically, power-on time of the storage system may be determined by monitoring Self-Monitoring Analysis and Reporting Technology (SMART) attributes of the storage device. Regarding a specific type of storage device, power-on time thresholds corresponding to the change points 820 and 830 described with reference to FIG. 8 may be determined respectively based on statistics on power-on time. During the running of the storage system 100, power-on time of each storage device may be monitored, and the monitored power-on time may be compared with a power-on time threshold so as to determine whether each storage device currently locates in the early stage, the middle stage or the late stage.

According to example implementations of the present disclosure, if the wear level indicates the storage device currently locates in the early, middle or late stage, then the scrubbing interval 230 may be reduced. It will be understood if the storage device currently locates in the early stage or late stage of the lifecycle, then the probability that the storage device fails may be high, so the scrubbing interval may be reduced so as to perform scrubbing operations more frequently. For example, if a conventional scrubbing interval is 30 days, then the scrubbing interval 230 may be set lower than the conventional scrubbing interval, e.g., set to 20 says. In this way, the storage device may be scanned with higher frequency, and further the possibility of detecting failures may be increased.

According to example implementations of the present disclosure, if it is determined the wear level is in the middle stage of the lifecycle, then the scrubbing interval may be increased. As the storage device is used longer, the storage device enters the middle stage from the early stage of the lifecycle, at which point the scrubbing interval 230 may be increased. For example, the scrubbing interval may be restored to 30 days. For another example, if the storage device locates in a stable state for a long time, the scrubbing interval 230 may further be increased. With example implementations of the present disclosure, by increasing the scrubbing interval within the time period when the storage system 110 runs stably, the frequency of performing scrubbing operations may be reduced, and further extra overheads caused by scrubs on the normal operation of the storage system 100 may be cut down.

With reference to FIGS. 2 to 8, detailed description has been presented on how to determine the failed extent 250 in the storage system 100. After the failed extent 250 is determined, further processing may be performed on the failed extent 250, thereby avoiding data loss in the storage system 100. According to example implementations of the present disclosure, a free storage device that includes no failed extent or only a few failed extents may be selected from a plurality of storage devices. Furthermore, data in the failed extent(s) may be rebuilt to a free extent in the free storage device. With the foregoing example implementations, the reliability of the storage device may be improved, and also data loss in the storage device may be avoided.

Figure 9:
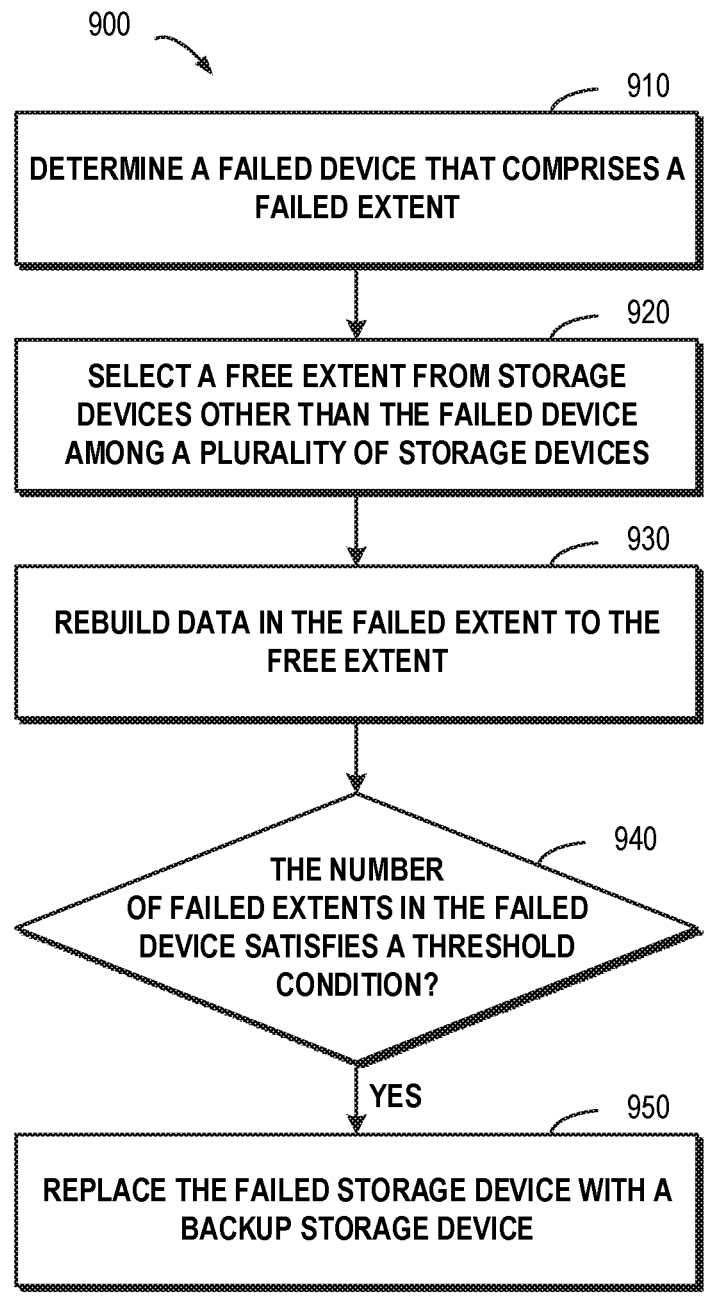
FIG. 9 schematically shows a flowchart of a method for performing a subsequent operation to a failed extent according to one implementation of the present disclosure.

FIG. 9 schematically shows a flowchart of a method 900 for performing a subsequent operation to a failed extent according to one implementation of the present disclosure. As depicted, at block 910, a failed device comprising the failed extent may be determined, here the failed device refers to a storage device where the failed extent resides. At block 920, a free extent may be selected from storage device other than the failed device in the storage system 100. It will be understood since a plurality of failed extents may be detected, and they may be distributed among different storage devices, preferably a free extent may be selected from a storage device that does not include any failed extent (or only includes a few failed extents). Subsequently, at block 930, data in the failed extent may be rebuilt to the selected free extent.

It will be understood that a failure in the failed extent 250 may be further subdivided into different failure levels. For example, a failure level may be determined based on the response time and/or other parameters in the failure identifier 610. According to example implementations of the present disclosure, when the response time serves as a basis for determining the failure level, if the response time becomes longer, but read and write operations can be completed within an acceptable time, then it may be considered the failure belongs to minor failures and may be handled with lower priority. If the response time becomes longer and reaches "no response" degree, then it may be considered the failure belongs to serious failures and needs to be handled as a priority.

According to example implementations of the present disclosure, regarding a minor failure, data in the failed extent 250 may be copied to the free extent. At this point, although the response time of the failed extent 250 gets longer, read and write operations still can be performed on the failed extent, so data in the failed extent 250 may be directly copied to a normal extent.

According to example implementations of the present disclosure, the storage system 100 may be a storage system that does not include any redundant data, or may be a storage system comprising redundant data. Related rebuild procedures will be described separately. When the storage system 100 is one that does not include redundant data, a rebuild operation may be performed based on a copy method. If the failed extent has crashed and reaches a "no response" degree, at this point a copy operation will fail and data in the failed extent 250 will be subject to the risk of being lost. When the storage system 100 is one that comprises redundant data, data in the failed extent 250 may be recovered to the free extent based on data in other extent associated with the failed extent in the storage system 100. For example, suppose the storage system 100 is a Redundant Array of Independent Disks (RAID) based storage system, the data in the failed extent 250 may be recovered based on data in other normal storage devices.

According to example implementations of the present disclosure, when the number of failed extents in a storage device reaches a predetermined threshold, the storage device may be replaced with a backup storage device. In this way, the risk of data loss in the storage system 100 may be further reduced.

While examples of the method according to the present disclosure have been described in detail with reference to FIGS. 2 to 9, description is presented below to the implementation of a corresponding apparatus. According to example implementations of the present disclosure, provided is an apparatus for managing scrubbing operations in a storage system. The apparatus comprises: an obtaining module configured to, regarding a plurality of extents included in the storage system, obtain respective usage states of the plurality of extents; a detecting module configured to detect from the plurality of extents a group of target extents in which a failure will occur based on the respective usage states of the plurality of extents; an adjusting module configured to adjust, according to the detected group of target extents, a scrubbing interval of the scrubbing operations to be performed on the storage system; and a performing module configured to perform, according to the adjusted scrubbing interval, a scrubbing operation on at least one part of the plurality of extents in the storage system so as to identify a failed extent.

According to example implementations of the present disclosure, the adjusting module comprises: a setting module configured to set the scrubbing interval to "execute immediately" in response to determining the group of target extents satisfy a predetermined condition; and the performing module comprises: a partial performing module configured to immediately perform a partial scrubbing operation on the group of target extents so as to identify the failed extent.

According to example implementations of the present disclosure, the detecting module comprises: a feature determining module configured to determine respective features of extents of the plurality of extents based on the respective usage states of the plurality of extents; an association obtaining module configured to obtain an association between failures in the plurality of extents and respective features of the plurality of extents; and an identifying module configured to identify from the plurality of extents the group of target extents in which latent failures will occur based on respective features of the plurality of extents and the association.

According to example implementations of the present disclosure, the usage state comprises a response time of each extent of the plurality of extents for an access time, where the feature obtaining module comprises: a time feature determining module configured to, regarding a given extent of the plurality of extents, determine a given feature of the given extent of the plurality of extents in response to the response time of the given extent being higher than a predetermined threshold.

According to example implementations of the present disclosure, the usage state further comprises failure information and a failure identifier of each extent of the plurality of extents, and the feature obtaining module comprises: a failure feature determining module configured to, regarding the given extent, determine the given feature of the given extent based on the failure information and the failure identifier of the given extent.

According to example implementations of the present disclosure, the association obtaining module comprises: an association training the association based on features of the plurality of extents included in the plurality of storage devices of the storage system and failures in the plurality of extents included in the plurality of storage devices of the storage system.

According to example implementations of the present disclosure, the adjusting module comprises: a wear determining module configured to determine a wear level of the plurality of extents in response to determining no target extent in which a latent failure will occur is detected; and an interval adjusting module configured to adjust the scrubbing interval according to the determined wear level.

According to example implementations of the present disclosure, the interval adjusting module comprises: a reducing module configured to reduce the scrubbing interval in response to determining the wear level locates in any of an early stage and a late stage of a lifecycle of a storage device in the storage system; and an increasing module configured to increase the scrubbing interval in response to determining the wear level locates in a middle stage of the lifecycle.

According to example implementations of the present disclosure, the performing module comprises: a global performing module configured to perform a global scrubbing operation on the plurality of extents according to the adjusted scrubbing interval, so as to identify the failed extent.

According to example implementations of the present disclosure, the apparatus further comprises: a selecting module configured to select a free storage device from storage devices other than a storage device comprising the failed extent among a plurality of storage devices in the storage system; and a rebuilding module configured to rebuild data in the failed extent to a free extent in the free storage device.

Figure 10:
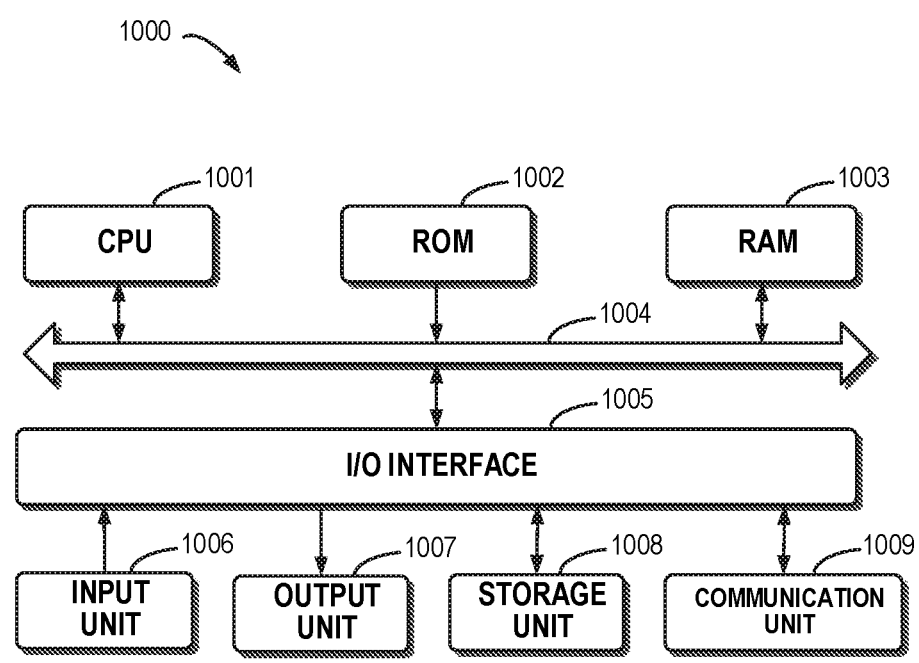
FIG. 10 schematically shows a block diagram of a device for managing scrubbing operations in a storage system according to example implementations of the present disclosure.

FIG. 10 schematically shows a block diagram of a device 1000 for managing scrubbing operations in a storage system according to example implementations of the present disclosure. As depicted, the device 1000 includes a central processing unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 are connected to the I/O interface 1005, including: an input unit 1006, such as a keyboard, mouse and the like; an output unit 1007, e.g., various kinds of displays and loudspeakers etc.; a storage unit 1008, such as a magnetic disk and optical disk etc.; and a communication unit 1009, such as a network card, modem, wireless transceiver and the like. The communication unit 1009 allows the device 1000 to exchange information/data with other devices via the computer network, such as Internet, and/or various telecommunication networks.

The above described process and treatment, such as the methods 300 and 900 can also be executed by the processing unit 1001. For example, in some implementations, the methods 300 and 900 can be implemented as a computer software program tangibly included in the machine-readable medium, e.g., the storage unit 1008. In some implementations, the computer program can be partially or fully loaded and/or mounted to the device 1000 via ROM 1002 and/or the communication unit 1009. When the computer program is loaded to the RAM 1003 and executed by the CPU 1001, one or more steps of the above described methods 300 and 900 can be implemented. Alternatively, in other implementations, the CPU 1001 also can be configured in other suitable manners to realize the above procedure/method.

According to example implementations of the present disclosure, there is provided a device, comprising: at least one processor; a volatile memory; and a memory coupled to the at least one processor, the memory having instructions stored thereon, the instructions, when executed by the at least one processor, causing the device to perform acts for managing scrubbing operations in a storage system. The acts include: regarding a plurality of extents included in the storage system, obtaining respective usage states of the plurality of extents; detecting from the plurality of extents a group of target extents in which a failure will occur based on the respective usage states of the plurality of extents; adjusting, according to the detected group of target extents, a scrubbing interval of the scrubbing operations to be performed on the storage system; and performing, according to the adjusted scrubbing interval, a scrubbing operation on at least one part of the plurality of extents in the storage system so as to identify a failed extent.

According to example implementations of the present disclosure, adjusting, according to the detected group of target extents, the scrubbing interval of scrubbing operations to be performed on the storage system comprises: setting the scrubbing interval to "execute immediately" in response to determining the group of target extents satisfy a predetermined condition; and performing, according to the adjusted scrubbing interval, the scrubbing operation on the at least one part of the plurality of extents in the storage system so as to identify the failed extent comprises: immediately performing a partial scrubbing operation on the group of target extents so as to identify the failed extent.

According to example implementations of the present disclosure, detecting from the plurality of extents the group of target extents in which the failure will occur based on the respective usage states of the plurality of extents comprises: determining respective features of extents of the plurality of extents based on the respective usage states of the plurality of extents; obtaining an association between failures in the plurality of extents and respective features of the plurality of extents; and identifying from the plurality of extents the group of target extents in which latent failures will occur based on respective features of the plurality of extents and the association.

According to example implementations of the present disclosure, the usage state comprises a response time of each extent of the plurality of extents for an access time, where determining respective features of respective extents of the plurality of extents comprises: regarding a given extent of the plurality of extents, determining a given feature of the given extent of the plurality of extents in response to the response time of the given extent being higher than a predetermined threshold.

According to example implementations of the present disclosure, the usage state further comprises failure information and a failure identifier of each extent of the plurality of extents, and determining respective features of respective extents of the plurality of extents comprises: regarding the given extent, determining the given feature of the given extent based on the failure information and the failure identifier of the given extent.

According to example implementations of the present disclosure, obtaining the association comprises: training the association based on features of the plurality of extents included in the plurality of storage devices of the storage system and failures in the plurality of extents included in the plurality of storage devices of the storage system.

According to example implementations of the present disclosure, adjusting, according to the detected group of target extents, the scrubbing interval of the scrubbing operations to be performed on the storage system comprises: determining a wear level of the plurality of extents in response to determining no target extent in which a latent failure will occur is detected; and adjusting the scrubbing interval according to the determined wear level.

According to example implementations of the present disclosure, adjusting the scrubbing interval according to the determined wear level comprises any of: reducing the scrubbing interval in response to determining the wear level locates in any of an early stage and a late stage of a lifecycle of a storage device in the storage system; and increasing the scrubbing interval in response to determining the wear level locates in a middle stage of the lifecycle.

According to example implementations of the present disclosure, performing, according to the adjusted scrubbing interval, the scrubbing operation on the at least one part of the plurality of extents in the storage system so as to identify the failed extent comprises: performing a global scrubbing operation on the plurality of extents according to the adjusted scrubbing interval so as to identify the failed extent.

According to example implementations of the present disclosure, the acts further comprise: selecting a free storage device from storage devices other than a storage device comprising the failed extent among a plurality of storage devices in the storage system; and rebuilding data in the failed extent to a free extent in the free storage device.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, where the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatuses and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

I claim:

1. A method for managing scrubbing operations in a storage system, the method comprising:
   obtaining usage states of a plurality of extents in the storage system,
      wherein each of the plurality of extents is a pre-defined storage space within the storage system allocated for storing a predetermined amount of data,
      wherein a usage state of an extent comprises a first plurality of states of the extent and a second plurality of states of a storage device to which the extent belongs;
   detecting, from the plurality of extents, a group of target extents in which a failure will occur based on the usage states, and features of extents determined from the usage states, of the plurality of extents,
      wherein the failure will cause the extent to become completely unusable for storage operations of the storage system,
      wherein a feature of the extent comprises a multi-dimensional data structure reflecting values corresponding to at least a subset of a combination of the first and second pluralities of states, the values respective to the extent;
   adjusting, according to the detected group of target extents, a scrubbing interval of a scrubbing operation to be performed on the storage system; and
   performing, according to the adjusted scrubbing interval, the scrubbing operation on at least one part of the plurality of extents in the storage system; and identifying, based on the scrubbing operation, a failed extent of the plurality of extents,
    wherein the failed extent is no longer usable for storage operations of the storage system.

2. The method of claim 1,
wherein adjusting, according to the detected group of target extents, the scrubbing interval of the scrubbing operation to be performed on the storage system comprises:
    setting the scrubbing interval to "execute immediately" in response to determining the group of target extents satisfy a predetermined condition; and
wherein performing, according to the adjusted scrubbing interval, the scrubbing operation on the at least one part of the plurality of extents in the storage system comprises:
    immediately performing a partial scrubbing operation on the group of target extents.

3. The method of claim 1, wherein detecting from the plurality of extents the group of target extents in which the failure will occur based on the usage states, and the features of extents determined from the usage states, of the plurality of extents comprises:
    obtaining an association between failures in the plurality of extents and the features of the plurality of extents; and
    identifying from the plurality of extents the group of target extents in which latent failures will occur based on the features of the plurality of extents and the association.

4. The method of claim 3,
wherein the usage states of the plurality of extents comprises a response time of each extent of the plurality of extents for an access time,
wherein determining the features of extents of the plurality of extents comprises:
    for a given extent of the plurality of extents, determining a feature of the given extent in response to the response time of the given extent being higher than a predetermined threshold.

5. The method of claim 4,
wherein the usage states of the plurality of extents further comprises failure information and a failure identifier of each extent of the plurality of extents, and
determining the features of extents of the plurality of extents further comprises:
    regarding the given extent, determining the feature of the given extent additionally based on the failure information and the failure identifier of the given extent.

6. The method of claim 3, wherein obtaining the association comprises:
    training the association based on features of the plurality of extents included in a plurality of storage devices of the storage system and failures in the plurality of extents included in the plurality of storage devices of the storage system.

7. The method of claim 1, wherein adjusting, according to the detected group of target extents, the scrubbing interval of the scrubbing operation to be performed on the storage system comprises:
    determining a wear level of the plurality of extents in response to determining no target extent in which a latent failure will occur is detected; and
    adjusting the scrubbing interval according to the determined wear level.

8. The method of claim 7, wherein adjusting the scrubbing interval according to the determined wear level comprises any of:
    reducing the scrubbing interval in response to determining the wear level in any of an early stage and a late stage of a lifecycle of a storage device in the storage system; and
    increasing the scrubbing interval in response to determining the wear level in a middle stage of the lifecycle of the storage device in the storage system.

9. The method of claim 7, wherein performing, according to the adjusted scrubbing interval, the scrubbing operation on the at least one part of the plurality of extents in the storage system:
    performing a global scrubbing operation on the plurality of extents according to the adjusted scrubbing interval.

10. The method of claim 1, further comprising:
    selecting a free storage device from storage devices other than a storage device comprising the failed extent among a plurality of storage devices in the storage system; and
    rebuilding data in the failed extent to a free extent in the free storage device.

11. A device, the device comprising:
at least one processor;
a volatile memory; and
a memory coupled to the at least one processor and having instructions stored thereon, the instructions, when executed by the at least one processor, causing the device to perform acts for managing scrubbing operations in a storage system, the acts comprising:
    obtaining usage states of a plurality of extents in the storage system,
        wherein each of the plurality of extents is a predefined storage space within the storage system allocated for storing a predetermined amount of data,
        wherein a usage state of an extent comprises a first plurality of states of the extent and a second plurality of states of a storage device to which the extent belongs;
    detecting, from the plurality of extents, a group of target extents in which a failure will occur based on the usage states, and features of extents determined from the usage states, of the plurality of extents,
        wherein the failure will cause the extent to become completely unusable for storage operations of the storage system,
        wherein a feature of the extent comprises a multi-dimensional data structure reflecting values corresponding to at least a subset of a combination of the first and second pluralities of states, the values respective to the extent;
    adjusting, according to the detected group of target extents, a scrubbing interval of a scrubbing operation to be performed on the storage system; and
    performing, according to the adjusted scrubbing interval, the scrubbing operation on at least one part of the plurality of extents in the storage system; and
    identifying, based on the scrubbing operation, a failed extent of the plurality of extents,
        wherein the failed extent is no longer usable for storage operations of the storage system.

12. The device of claim 11,
wherein adjusting, according to the detected group of target extents, the scrubbing interval of the scrubbing operation to be performed on the storage system comprises:
setting the scrubbing interval to "execute immediately" in response to determining the group of target extents satisfy a predetermined condition; and
wherein performing, according to the adjusted scrubbing interval, the scrubbing operation on the at least one part of the plurality of extents in the storage system comprises:
immediately performing a partial scrubbing operation on the group of target extents.

13. The device of claim 11, wherein detecting from the plurality of extents the group of target extents in which the failure will occur based on the usage states, and the features of extents determined from the usage states, of the plurality of extents comprises:
obtaining an association between failures in the plurality of extents and the features of the plurality of extents; and
identifying from the plurality of extents the group of target extents in which latent failures will occur based on the features of the plurality of extents and the association.

14. The device of claim 13,
wherein the usage states of the plurality of extents comprises a response time of each extent of the plurality of extents for an access time,
wherein determining the features of extents of the plurality of extents comprises:
for a given extent of the plurality of extents, determining a feature of the given extent in response to the response time of the given extent being higher than a predetermined threshold.

15. The device of claim 14,
wherein the usage states of the plurality of extents further comprises failure information and a failure identifier of each extent of the plurality of extents, and
determining the features of extents of the plurality of extents further comprises:
regarding the given extent, determining the feature of the given extent additionally based on the failure information and the failure identifier of the given extent.

16. The device of claim 13, wherein obtaining the association comprises:
training the association based on features of the plurality of extents included in a plurality of storage devices of the storage system and failures in the plurality of extents included in the plurality of storage devices of the storage system.

17. The device of claim 11, wherein adjusting, according to the detected group of target extents, the scrubbing interval of the scrubbing operation to be performed on the storage system comprises:

determining a wear level of the plurality of extents in response to determining no target extent in which a latent failure will occur is detected; and
adjusting the scrubbing interval according to the determined wear level.

18. The device of claim 17, wherein adjusting the scrubbing interval according to the determined wear level comprises any of:
reducing the scrubbing interval in response to determining the wear level in any of an early stage and a late stage of a lifecycle of a storage device in the storage system; and
increasing the scrubbing interval in response to determining the wear level in a middle stage of the lifecycle of the storage device in the storage system.

19. The device of claim 17, wherein performing, according to the adjusted scrubbing interval, the scrubbing operation on the at least one part of the plurality of extents in the storage system:
performing a global scrubbing operation on the plurality of extents according to the adjusted scrubbing interval.

20. A computer program product, tangibly stored on a non-transient computer readable medium and comprising machine executable instructions, which are used to perform a method, the method comprising:
obtaining usage states of a plurality of extents in the storage system,
wherein each of the plurality of extents is a pre-defined storage space within the storage system allocated for storing a predetermined amount of data,
wherein a usage state of an extent comprises a first plurality of states of the extent and a second plurality of states of a storage device to which the extent belongs;
detecting, from the plurality of extents, a group of target extents in which a failure will occur based on the usage states, and features of extents determined from the usage states, of the plurality of extents,
wherein the failure will cause the extent to become completely unusable for storage operations of the storage system,
wherein a feature of the extent comprises a multi-dimensional data structure reflecting values corresponding to at least a subset of a combination of the first and second pluralities of states, the values respective to the extent;
adjusting, according to the detected group of target extents, a scrubbing interval of a scrubbing operation to be performed on the storage system; and
performing, according to the adjusted scrubbing interval, the scrubbing operation on at least one part of the plurality of extents in the storage system; and
identifying, based on the scrubbing operation, a failed extent of the plurality of extents,
wherein the failed extent is no longer usable for storage operations of the storage system.

* * * * *